United States Patent

[11] 3,560,785

| [72] | Inventors | Fedor Evgenievich Temnikov<br>Lefortovskyval, 7/6, korpus 3, kv. 41;<br>Vyacheslav Dmitrievich Savin, Gospitalny val, 3. korpus 1, kv. 10u; Jury Alexeevich Ivashkin, prospekt Mira, 118, kv. 214, Moscow, U.S.S.R. |
|---|---|---|
| [21] | Appl. No. | 773,993 |
| [22] | Filed | Nov. 7, 1968 |
| [45] | Patented | Feb. 2, 1971 |

[54] GAS-DISCHARGE DISPLAY INSTRUMENT
7 Claims, 4 Drawing Figs.
[52] U.S. Cl. .................... 313/109.5, 313/210, 313/217
[51] Int. Cl. .................... H01j 7/42
[50] Field of Search .................... 313/109.5, 210, 217; 315/84.6, 169(TV), 169

[56] References Cited
UNITED STATES PATENTS
3,456,152 7/1969 Andersen .................... 315/84.6

*Primary Examiner*—Raymond F. Hossfeld
*Attorney*—Waters, Roditi, Schwartz & Nissen ABSTRACT: A gas-discharge display instrument for indicating digital magnitudes includes a common electrode and a group of electrodes spaced therefrom and operatively associated therewith. The group of electrodes are concentrically arranged. Each electrode in the group successively corresponds to a respective digit in a series of a succession of digits and is adapted to illuminate over the periphery thereof to indicate the digit corresponding thereto.

PATENTED FEB 2 1971     3,560,785

GAS-DISCHARGE DISPLAY INSTRUMENT

The present invention relates to gas-discharge display instruments featuring discrete analogue representation of values being quantized, intended for visual appreciation thereof, as well as for combined representation of a multiplicity of quantized values.

Known in the present state of the art are display instruments featuring digital indication which are designed for visual reproduction of information in a digital form and provided with one common anode connected to the positive pole of a supply source and to 10 cathodes made in the form of numerals from 0 to 9 which through their particular outlets are selectively connected to the negative pole of the supply source so as to provide an illuminating signal.

The disadvantage of conventional display instruments is their low efficiency when employed for representing large amounts of digital information due to repetitive psychological effect of the information upon an operator who may fail to account for the significance of the signals being represented, which fact fails to form a convenient perceptible visual and figurative picture of the information complex.

The invention is aimed at the development of a gas-discharge display instrument featuring discrete analogue representation of quantized values duly accounting for the principle of significance, according to which the intensity of psychological effect of information characters varies and depends on the significance of the values being represented.

Said object is accomplished by the fact that the gas-discharge display instrument for representation of the magnitudes of quantized values, comprises one common electrode which, when being switched, is fed with an electrical potential of one sign, and a group of electrodes selectively connected to the source of potential featuring the opposite sign, said electrodes being adapted to luminate with the appearance of an electrical potential of a certain value across said electrodes and the common electrode, and according to the invention the luminant electrodes arranged in a certain order differ from one another in the value of the surface thereof and/or in the value of the perimeter of their luminescence so that said values consecutively increase in a certain direction of said order.

It is expedient that the luminant electrodes be assigned the shape of polygons or rings arranged concentrically.

It is preferable, that the luminant electrodes be arranged in one plane coinciding with the plane in which the signal is represented.

The invention will be hereinbelow described by way of an exemplary embodiment thereof with due reference to the accompanying drawings wherein.

Figure 1:
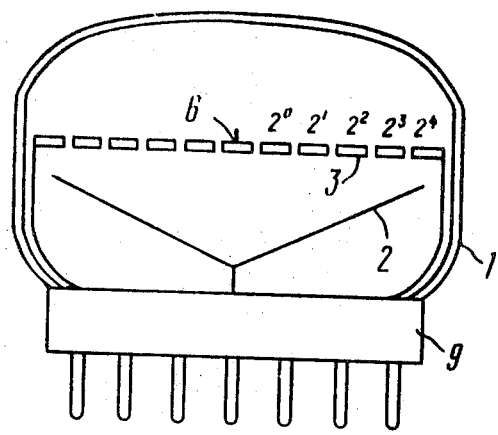
FIG. 1 is a side view of a gas-discharge display instrument according to the invention.
Figure 2:
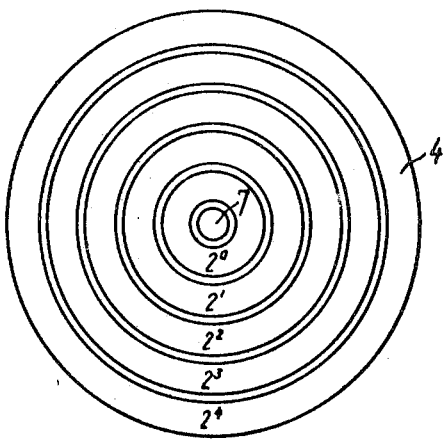
FIG. 2 is a top view of an embodiment of the luminant electrodes according to the invention.

The herein-disclosed gas-discharge display instrument for representation of the magnitudes of quantized values comprises a glass bulb 1 (FIG. 1) wherein a common anode 2 and a group of cathodes 3 are accommodated. The number of the cathodes 3 corresponds to that of digits in a number limiting the range of represented quantized values in the adopted numeric system, the cathodes 3 with larger surface and perimeter of luminescence corresponding to the larger digits. FIG. 1 shows five cathodes 3 of the corresponding five digits of the binary numeric system with weights $2^0$, $2^1$, $2^2$, $2^3$, $2^4$. The cathodes are made as concentric rings 4 (FIG. 2) or polygons 5 (FIG. 3), arranged in one plane so that to the larger weight of the binary digit corresponds the ring 4 of a larger diameter (or the polygon 5 with a larger perimeter).

Figure 3:
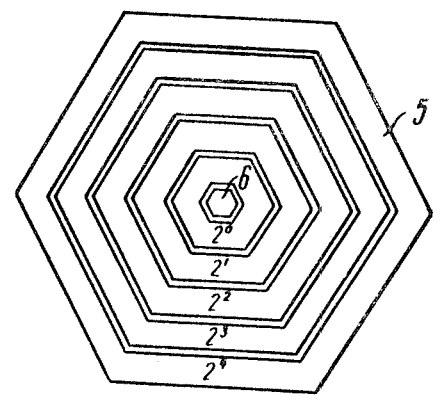
FIG. 3 is another embodiment of the luminant electrodes according to the invention.

For displaying a zero magnitude of a quantized value or any other data about said value, such as its sign, use is made of at least one auxiliary cathode 6 (FIG. 1) made as a circle 7 (FIG. 2) or a polygon 6 (FIG. 3). In general the shape and the arrangement of auxiliary luminant electrodes may be arbitrary.

Figure 4:
FIG. 4 is a side view of the arrangement of luminant electrodes spaced differently from the common electrode, according to the invention.

The cathodes 3 may be arranged either in one plane (cf. FIG. 1) or in different planes (cf. FIG. 4).

The instrument in contemplation is provided with a base 9 (FIG. 1) with an outlet from a common anode 2 and with separate outlets from each cathode 3.

The operation of the instruments is as follows: Upon building up of an electrical potential of a certain value across the anode 2 and at least one of the cathodes 3, a gas discharge occurs in the gas-filled glass bulb 1 which is accompanied by cathode luminescence. For the herein-considered case the concentric rings 4 (FIG. 2) or the polygons 5 (FIG. 3) are luminant bodies whose diameter increases with an increase in the number of the binary digit of the quantized values represented in the binary code. As a result, the larger value of the binary number is indicated by a larger surface or larger perimeter of the luminant surface area. At zero magnitude of the indicated value a central cathode 6 is illuminated.

With variation of the value of electrical potential across the common anode 2 and the selectively connected cathode 3 the intensity of luminescence of the latter varies. This fact is used for indication of quantized values in the numeric systems with the base higher than two, as well as for combined representation of a set of values.

In the first case the intensity of luminescence of the cathodes 3 is determined by a numeral of the alphabet of the adopted numeric system, so that a higher luminous intensity corresponds to a larger 1-digit number.

With combined representation of a set of the quantities each luminant electrode 3 may correspond to a certain region of magnitudes, whereas the luminous intensity may correspond to the number of quantities which are within the given region or to the repetition rate of their getting into said given region.

The selection of the cathodes 3, as well as voltage modulation across the anode 2 and the selected cathode 3 may be effected by resorting to conventional relay contact apparatus, or conventional contactless electrovacuum, gas-discharge and semiconductor means, not shown in the drawings.

The gas-discharge display instrument featuring discrete analogue representation of the magnitudes of quantized values is designed for visual figurative display of said values, represented in a binary (tertiary) code, as well as for combined figurative representation of a set of values before the operator, while the conventional gas-discharge instruments of digital indication, as well as other pointer and digital instruments fail to convey the figurative picture of the information complex.

The main advantage of the display instrument in contemplation lies in the employment of the principle of significance of the represented information according to which to higher values of the controlled parameters or their deviations from the rated ones there correspond figures of larger size, which fact determines the intensity of psychological effect of the information characters.

Though this invention has been described herein with reference to the preferable embodiment, it will be understood that minor changes in the details of the construction may be made without departing from the spirit and scope of the invention, as will be readily understood by those competent in the trade.

All these alterations and changes will be considered to remain within the spirit and scope of the invention and the claims that follow.

We claim:

1. A gas-discharge display instrument for indicating digital magnitudes, said instrument comprising an envelope containing a gas, a common electrode, said common electrode being maintained at a potential of prescribed sign, and a group of annular electrodes, said group of annular electrodes being spaced proximate said common electrode for operative association therewith and maintained at a potential opposite in sign of that of said prescribed sign of said common electrode, said group of annular electrodes being concentrically arranged and annularly spaced from one another to provide a succession of increasing sizes of illuminating perimeters, each annular electrode in said group of annular electrodes successively corresponding respectively to a respective digit in a series of successively increasing digits and being adapted for illuminating over the perimeter thereof upon gas discharge between each said annular electrode and said common electrode to indicate the respective digit corresponding thereto, whereby the succession of the magnitudes of the digits is dependent upon the succession of sizes of the illuminating perimeters of said group of annular electrodes.

2. A gas-discharge display instrument as claimed in claim 1 wherein said group of electrodes include an innermost electrode and an outermost electrode, said succession of digits increasing in magnitude from said innermost electrode to said outermost electrode.

3. A gas-discharge display instrument as claimed in claim 1 wherein said group of electrodes are concentrically arranged substantially in a plane.

4. A gas-discharge display instrument as claimed in claim 1 wherein said group of electrodes are concentrically arranged and axially spaced from one another.

5. A gas-discharge display instrument as claimed in claim 1 wherein said group of electrodes are circular.

6. A gas-discharge display instrument as claimed in claim 1 wherein said group of electrodes are polygonal.

7. A gas-discharge display instrument as claimed in claim 2 including an auxiliary electrode centrally disposed internally of said innermost electrode, said auxiliary electrode being adapted for indicating a magnitude of zero.